B. A. SHAW.
ANIMAL TRAP.
APPLICATION FILED OCT. 10, 1910.
1,052,181.
Patented Feb. 4, 1913.
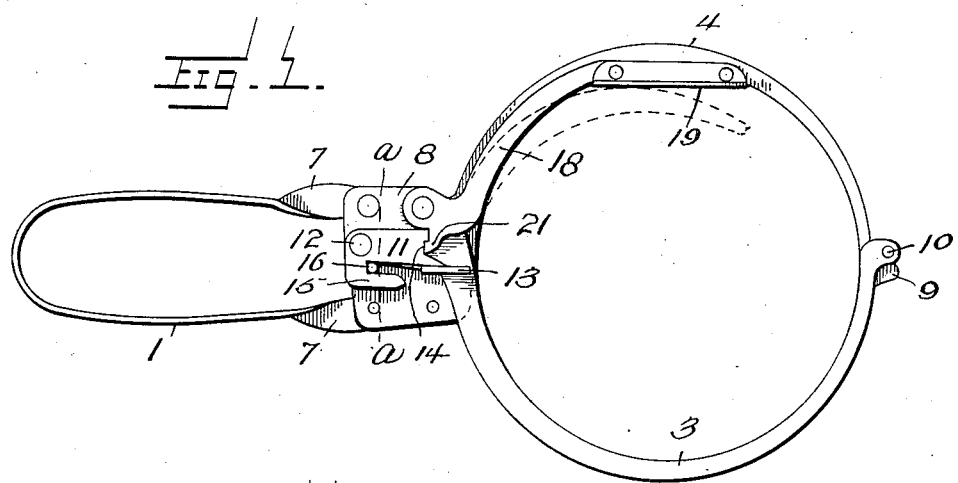
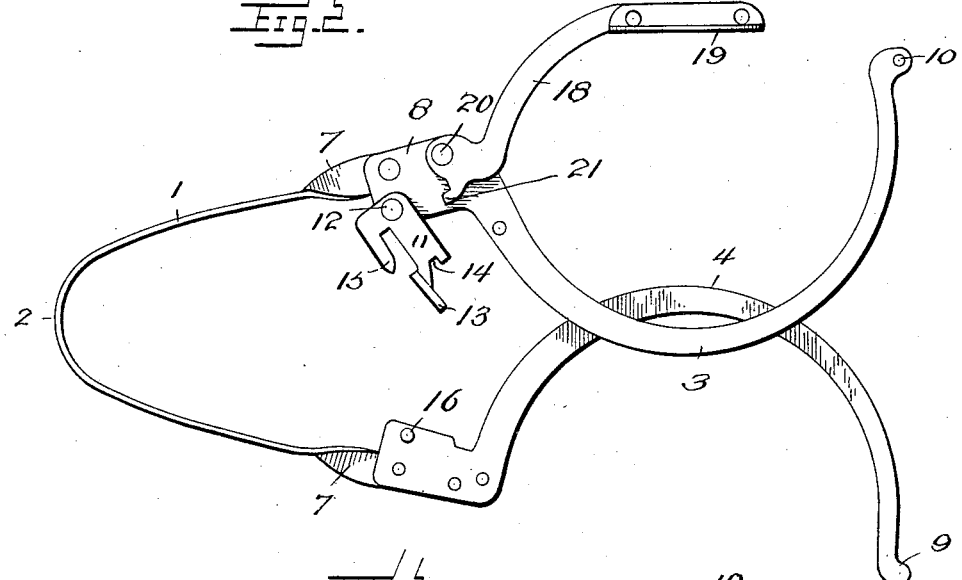
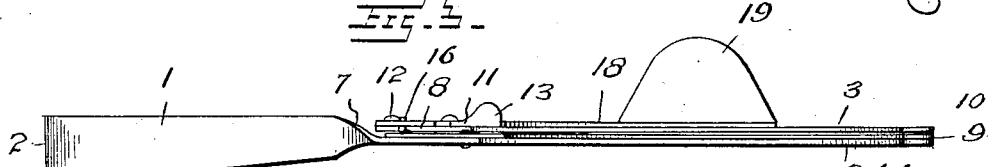
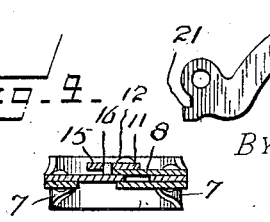
INVENTOR
WITNESSES:
BY
Attorney

UNITED STATES PATENT OFFICE.

BRUCE A. SHAW, OF DAVENPORT, IOWA.

ANIMAL-TRAP.

1,052,181.  Specification of Letters Patent.  Patented Feb. 4, 1913.

Application filed October 10, 1910. Serial No. 586,342.

*To all whom it may concern:*

Be it known that I, BRUCE A. SHAW, a citizen of the United States, and a resident of Davenport, in the county of Scott and State of Iowa, have invented certain new and useful Improvements in Animal-Traps, of which the following is such a full, clear, and exact description as will enable others skilled in the art to which it pertains to make and use the same.

My invention relates to animal traps, such as are provided with movable jaws actuated by a spring.

The particular object of my invention is to provide a device of this character with laterally moving jaws and it consists in the arrangement, construction and combination of the various parts hereinafter described and claimed.

In the drawings hereto attached, in which similar reference characters refer to similar parts in all the drawings, Figure 1 is a perspective view of my improved trap in its set position, Fig. 2 the same after it has been sprung, Fig. 3 an edge view and Fig. 4 a detail sectional view along the line *a—a* of Fig. 1. Fig. 5 is a detail view of the trip lever.

Referring more particularly to the drawings, 1 represents the flat spring member, bent upon itself at 2, 3 and 4 are the jaws of crescent shape interlocking with each other as will be hereinafter more fully explained. A twist 7 in the flat spring 1 permits the attachment thereto of the jaws by means of rivets. As shown in Fig. 3, the jaw member 3 is composed of two members of crescent shape, disposed one above the other and spaced slightly apart to permit the jaw member 4 to slide laterally between them. A lug 9 formed with jaw 4 is adapted to engage rivet 10 in jaw 3 to prevent accidental disengagement of the jaws from their interlocked position when the trap is set.

The trap is set by bending or compressing the spring 1, when the jaw member 4 slides between members 3 comprising the opposing jaw member, the detent 11 pivoted at 12 on jaw 3 is slipped into engagement with stop 16 on jaw 4 by means of the upturned thumb piece 13 and lug 21 integral with trip 18, pivoted at 20 engages slot 14 in the detent. Trip 18 then lies in a curve nearly coincident with the convex curvature of jaw 4 and upon very slight pressure will be disengaged from slot 14 springing the trap. Jaw 4 will then pass between the crescents comprising jaw 3 and the animal caught will be held by the three crescents. A flattened projection 19 is formed on the trip 18 in one form of my invention and is adapted to prevent any possible failure of the trip to spring the trap. When it is desired to employ a very flat trap for the purpose of inserting in a narrow slit or crack, this projection lies in the plane of the crescents, when such arrangement is not material, the projection may be turned perpendicular to said plane as is shown in Fig. 3. This trap occupies no more space in set position than it does in sprung position, it does not require additional space to that which it normally occupies in which to be sprung and may be set equally well in horizontal or vertical position. The L shaped detent may be brought into engagement with the stop without endangering the hands of the person setting the trap.

Having thus fully described my invention, what I claim and desire to secure by Letters Patent is—

1. An animal trap comprising a flat spring bent upon itself, a pair of curved interlocking jaws rigidly attached to the respective ends of said spring adapted to interlock with each other and retain any object between the opposing concave edges of the jaws when the trap is sprung, an angular detent pivotally attached to one jaw member, a thumb piece formed with the detent, a slot in said detent, a curved trip pivotally attached to the same jaw member, a lug on the trip adapted to engage the slot in the detent.

2. An animal trap comprising a flat spring bent upon itself, crescent shaped jaws rigidly attached to the respective ends of said spring adapted to interlock with each other and retain any object between the opposing concave edges of the crescents when the trap is sprung, an L shaped detent pivotally attached to one jaw member adjacent to its attachment to the spring member, a thumb piece formed with the detent a slot in said detent, a crescent shaped trip pivotally attached to the same jaw member a lug on the trip adapted to engage the slot in the detent a flat upturned projection on the trip.

3. An animal trap comprising a flat spring bent upon itself, interlocking crescent shaped jaws rigidly attached to the respective ends of the said spring and curving outwardly therefrom, an L shaped detent pivotally attached to one jaw adjacent to its attachment to the spring, a crescent shaped tripping lever adapted to nearly coincide with the curvature of the jaw when the trap is in a set position, pivotal connection between the tripping lever and the same jaw on which the detent is mounted a slot in the detent, a lug on the tripping lever adapted to engage the slot, a flat projection on the free end of the tripping lever.

Subscribed by me in the presence of two subscribing witnesses.

BRUCE A. SHAW.

Witnesses:
J. A. HANLEY,
ADA B. SPARR.

Copies of this patent may be obtained for five cents each, by addressing the "Commissioner of Patents, Washington, D. C."